3,410,830
POLYMERS FROM POLYMERIZED UNSATURATED MATERIALS AND POLYISOCYANATOBIURETS
Isaac Goodman and John Edward Martin, Runcorn, England, assignors to Imperial Chemical Industries Limited, London, England, a corporation of Great Britain
No Drawing. Filed July 8, 1966, Ser. No. 563,725
Claims priority, application Great Britain, July 15, 1965, 30,066/65
6 Claims. (Cl. 260—77.5)

ABSTRACT OF THE DISCLOSURE

Cross-linkable compositions comprising a polymer having active hydrogen atoms and polyisocyanatobiuret of a polymethylene diamine. The polymer is preferably a copolymer of ethylene and acrylamide or methacrylamide. The compositions can be shaped by heating to a temperature at which the polymer is in the fluid state, shaping and subsequently heating the shaped article at 150° to 220° C.

---

This invention relates to cross-linkable compositions containing themoplastic polymers of the kind derived from the polymerisation of mono-ethylenically unsaturated monomers.

Polymers derived from mono-ethylenically unsaturated monomers generally soften or flow on heating and then revert to the solid state on cooling. The cycle can be repeated and this property of permanent fusibility, or thermoplasticity as it is more generally termed, is the prime reason for the utility of these polymers as moulding materials since they can readily be shaped in the softened or molten state at moderately elevated temperatures on suitably designed machinery, e.g. injection- and compression-moulding equipment, presses, vacuum-forming equipment, rotational-casting equipment and extruders.

Wider applications for these thermoplastic polymers could be envisaged, however, if their tendency to soften and flow at these moderately elevated temperatures could be reduced after the shaping process has been completed. Such reduction can be achieved by cross-linking; a reaction which involves forming chemical links between adjacent polymer chains, either by creating inter-reactable sites on the polymer chains or chemically by introducing a polyfunctional compound capable of reacting with repeating units in the polymer chains, thereby forming a macromolecular network. Methods of cross-linking that have found commercial success, especially in the field of polyethylenes, utilise the former alternative and involve the use of high energy irradiation or the incorporation of free radical generators such as peroxides. Irradiation methods are complex, difficult to control and costly if high dosages are required and have only found limited application. The incorporation of peroxides, on the other hand, has been found to yield compositions which tend to cross-link during shaping on conventional machinery such as injection- and compression-moulding machines and extruders whilst in the thermoplastic state and although this disadvantage can be overcome to some extent by modifying the equipment to shorten the dwell times, or by using peroxides having higher dissociation temperatures, both solutions are expensive.

Hitherto, the examination of chemical cross-linking methods has not been successful because premature reaction between the polymer and polyfunctional cross-linking agent has generally occurred, thereby rendering shaping difficult if not impossible. However, we believe that we have now reduced the danger of premature reaction by choosing as the polymeric component a polymer which contains active hydrogen atoms and as the polyfunctional cross-linking agent to be combined therewith a specified polyisocyanate. Our experiments have shown that compositions of these two materials may be subjected to thermal processes, e.g. milling or shaping, at moderately elevated temperatures, e.g. 110° C., for several minutes without inducing undue cross-linking and yet may be cross-linked quite readily by further heating at increased temperatures.

According to the present invention, therefore, we provide a cross-linkable composition comprising (i) a polymer derived essentially from monoethylenically unsaturated monomeric material polymers of which are thermoplastics and containing in the polymer chains units having active hydrogen atoms, and (ii) a polyisocyanatobiuret of a polymethylene diamine.

Our invention also provides a process for obtaining cross-linked compositions by heating a polymer with a polyisocyanatobiuret, both as hereinbefore defined, so as to cause the isocyanate groups of the polyisocyanatobiuret to react with the active hydrogen atoms of the polymer.

It will be readily apparent that this invention is applicable in general to polymers derived from any monoethylenically unsaturated monomer from which thermoplastic polymers may be derived, either by homopolymerisation or copolymerisation with other suitable monomers. All that is required is that said polymers may be modified chemically to a form which contains active hydrogen atoms, e.g. as in the case of polyethylene which may be oxidised to obtain in the polymer chains carbonyl groups which may then be reduced to —CHOH groups, or, preferably, that said monomers are copolymerisable with co-monomers which will provide in the resulting polymer chains units which either have active hydrogen atoms or are convertible to forms having active hydrogen atoms.

As is well known, said monomers are commonly found in the group having the structure $CH_2=CR_1R_2$ where $R_1$ is generally hydrogen, monovalent hydrocarbon, halogen or nitrile and $R_2$ is hydrogen, alkyl, halogen, —OCOR or —COOR where R is monovalent hydrocarbon. The most common examples are vinyl chloride (which yields thermoplastic polymers and copolymers), ethylene, methyl methacrylate and styrene but others include vinylidene chloride and acrylonitrile, thermoplastic products of both of which are generally copolymers. The invention is particularly described hereinafter with reference to polymers of ethylene but is applicable with equal effect to polymers of these other monomers.

These monomers (or mixtures thereof) may be co-polymerised with suitable comonomers to yield copolymers which may form the polymeric component of our cross-linkable compositions. The comonomer will either contain an active hydrogen atom or will yield units in the polymer chains which may be converted to units containing active hydrogen atoms, e.g. by hydrolysis or by reduction. Active hydrogen atoms are most conveniently found in hydroxyl (—OH), carboxylic acid (—COOH) or amino (—NH$_2$) groups and thus examples of the first kind of comonomer can include, e.g. acrylic acid and methacrylamide and examples of the second kind of comonomer can include hydrolysable vinyl esters, e.g. vinyl acetate. Other but less readily available sources of active hydrogen atoms are, for example, groups containing —SH combinations and as a general statement it may be said that active hydrogen atoms can be found linked to atoms found in the first two occupied periods of Groups V and VI of the Periodic Table of the Elements. A test for an active hydrogen atom is described in "Rodd's Chemistry of Carbon Compounds," 2nd edition, volume IA, p. 62.

By reason of general availability of the parent comonomers, we have found that repeating units having active hydrogen atoms generally have the structure

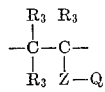

where each $R_3$ is selected from hydrogen or a monovalent hydrocarbon radical (generally an alkyl group having from 1 to 6 carbon atoms or a phenyl group) or the group —Z—Q, Z is a divalent organic radical or a direct linkage and Q is a polar radical having an —OH, —SH, >NH or —NH$_2$ group. In general no more than one $R_3$ will be —Z—Q. Where Z is not a direct linkage, it is preferably a divalent hydrocarbon radical (e.g. methylene, polymethylene, phenylene, etc.) but may also comprise, for example, a chain of carbon atoms interspersed with other atoms, e.g. —(CH$_2$)$_2$O(CH$_2$)$_2$—. Ordinarily, the use of residues wherein Z is a divalent organic radical has little or no advantage over the use of residues where Z is a direct linkage and for reasons of economy and availability of the parent comonomers, therefore, it is advisable to use the latter.

Q may be any polar radical containing an —OH, —SH, >NH or —NH$_2$ group and examples include: —NX$_2$, —CONX$_2$ —SO$_2$NX$_2$, —CONX·NX$_2$, —SO$_2$NX·NX$_2$, —NX·CONX$_2$, —C(:NX)NX$_2$, —C(:NOX)NX$_2$, —NX·OX, —COOH, —CO·OR'OH, —O·CO·R"OH, —OH, —SH, —P(:O)OH, —CH:NOH and —C$_6$H$_4$OH where in each radical at least on X represents a hydrogen atom, other X's being hydrogen atoms or monovalent hydrocarbon radicals, R' represents a divalent hydrocarbon group having a structure such that a phenylene group and/or a chain of at least 2, and generally from 2 to 10, carbon atoms links the ester group to the hydroxyl group and R" represents a divalent hydrocarbon group having a structure such that a phenylene group and/or a chain of one or more carbon atoms (generally 1 to 10 carbon atoms) links the ester group to the hydroxyl group. However, Q will commonly be —OH, —CONH$_2$ or —COOH; examples of readily available comonomers containing Q being acrylamide, methacrylamide, acrylic acid, methacrylic acid, 2-hydroxyethyl methacrylate, 2-hydroxyethyl acrylate and similar derivatives of methacrylic acid or acrylic acid and higher alkylene oxides.

Since the reaction of polyisocyanates with polymers having —COOH groups tends to yield carbon dioxide and since many polymers having hydroxyl (—OH) groups tend to have an undesirably high rate of reaction with isocyanate groups, it is generally preferred to use comonomers having —CONH$_2$ groups, particularly acrylamide and methacrylamide whose copolymerisation is well known.

The copolymerisation required to obtain the modified thermoplastic polymers may be effected by known processes and the methods and details of preparation peculiar to any particular combination of monomers may be deduced from simple experiment by any chemist with ordinary skill in the art of polymerisation.

While block or graft copolymers may be used in our compositions, random copolymers are the most suitable and therefore, as is well known, where monomers of widely differing reaction rates are to be copolymerised it may be necessary to add at least the more reactive monomer continuously to the polymerisation vessel.

To retain the essential character of the thermoplastic polymer, it is generally preferred to retain a major part, e.g. 99 to 60% by weight, of the principal monomer or monomers in the copolymer. On the other hand, the incorporation of at least 5% and generally from 5 to 25% by weight of units having the active hydrogen atom is generally desirable in order to obtain products showing usefully reduced tendencies to flow on heating after they have been cross-linked.

To form the composition of our invention the polymers containing active hydrogen atoms are then combined with polyisocyanatobiurets of polymethylene diamines. These compounds have the structure

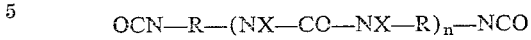

where R is polymethylene, each X is H or

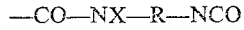

but at least one X is —CO—NX—R—NCO, and $n$ is an integer, generally of 1 to 5. They may be obtained by heating at least 3 moles of a polymethylene diisocyanate with one mole of water at 70° C. to 200° C., e.g. as described in British patent specification 876,503. Alternative methods of production include reacting one mole of the diisocyanate with one mole of a urea diisocyanate or by reacting a polymethylene diisocyanate with alkylamine vapour or with anhydrous formic acid. Depending upon the diisocyanate chosen and the degree of conversion in the biuret-forming reaction, these polyisocyanatobiurets may have a range of molecular weights and may vary in properties from liquid to solid materials.

The amount of polyisocyanatobiuret that should be used in our composition is preferably related to the quantity of active cross-linkable radicals in the polymer. However, the ratio of the two is not critical and may be varied within wide limits. It may not be desirable to use more of the polyisocyanatobiuret than the stoichiometric quantity required for combination with all the reactive groups of copolymer, and even as little as 2.5% of the stoichiometric amount of polyisocyanatobiuret produces a useful effect.

As already stated, the proportion of the active units in the polymer chain may be varied over a wide range and the degree of utilisation of these units may be varied at the discretion of the operator thereby giving a useful choice of cross-linkable compositions which may be adapted to diverse requirements. For example, to obtain a partially cross-linked product a polymer containing a low proportion of active units may be combined with a stoichiometric proportion of polyisocyanatobiuret or a polymer containing a higher proportion of active units may be combined with a less than stoichiometric proportion of polyisocyanatobiuret. Alternatively, where it is desired to obtain a highly cross-linked composition a high proportion of active units may be used in the polymer which is then combined with a stoichiometric quantity of polyisocyanatobiuret.

By way of example, we have found that in the case of copolymers of ethylene containing from 10 to 20% by weight of methacrylic acid or acrylamide units, treatment with one quarter of the amount of polyisocyanatobiuret required for complete reaction with all reactive groups will usually be found to give an adequate degree of cross-linking for the conferment of improved high temperature properties without undue loss of a desirable degree of flexibility and transparency in the product.

In all these cases the quantity of polyisocyanatobiuret to be used is calculated with respect to the free isocyanate group content.

Our compositions may be formed by mixing the polymer and polyisocyanatobiuret in any suitable manner. For example, they may be blended on a malaxator such as a heated roll-mill at a temperature which is preferably sufficient to bring the polymer into a fluid state but not above the reaction temperature of the mixture, temperatures of up to 110° C., or possibly somewhat above, being generally satisfactory. In an alternative process the polyisocyanatobiuret may be incorporated in a solution of the polymer in a suitable solvent, but removing the last traces of solvent from the composition so formed is often both difficult and costly. If desired, the polyisocyanatobiuret may also be blended with a homopolymer of the principal monomer of the polymer having the active hydrogen atoms and this blend may be mixed in suitable proportions with the said polymer.

In addition to the polymer and polyisocyanatobiuret, our compositions may also contain further components, if desired. For example it may be useful to incorporate fillers such as graphite, carbon black, glass and asbestos fibre, finely divided metals and metal oxides, etc. Foaming agents, heat and U.V. stabilisers, pigments, dyes and the like may also be added.

Our compositions may be cross-linked by heating them to cause the polyisocyanatobiuret to react with the active hydrogen atoms in the polymer. Temperatures in excess of 150° C. are generally suitable. For ethylene polymers, the temperature is preferably not above 220° C., and temperatures of from 180 to 200° C. are preferred. For the polymers of other monomers the preferred temperatures may be adjusted appropriately. Because of the risk of oxidative degradation of some of the specified polymers at the high temperatures sometimes involved, it may be desirable to conduct the cross-linking in an inert atmosphere.

If desired the compositions may be shaped before the cross-linking has proceeded to the extent that the material is no longer thermoplastic. Any of the usual shaping processes may be used. For example, the compositions may be injection-moulded, compression-moulded, extruded, pressed, vacuum-formed or rotationally cast. A desired amount of cross-linking may be effected during the fabrication step thereby reducing the amount of additional heat required to complete cross-linking.

After the shaping step, the cross-linking, or the completion of the cross-linking, may be effected as desired.

The products may be used as pipes and sheathings for pipes and hoses, as wire and cable insulation and as moulded parts, e.g. in small engineering applications and in many other applications where use can be made of their resistance to oils and acids, their relatively low thermal expansion coefficients for plastics materials, their electrical insulation properties and their resistance to creep under load and to stress cracking. They may also be used in the form of foams and as heat shrinkable film and sheathings.

The invention is now illustrated with reference to polymers of ethylene but the chemist will recognise that it is equally applicable to polymers of other ethylenically unsaturated monomers, e.g. vinyl chloride, methyl methacrylate and styrene, by analogy.

In all the examples, all parts are expressed as parts by weight.

Example 1

A weighed portion of an ethylene/acrylamide copolymer containing 20.8% by weight (9.4 mole percent) of acrylamide and having a melt flow index of 3.4, a flexural modulus of 87,000 lbs./sq. in. and a Vicat softening point of 80.5° C. was milled for ten minutes with 7.6% of its weight (equivalent to 27% of the stoichiometric amount required to react with all the amide groups) of a polyisocyanatobiuret identified below on a 6 inch, steam-heated two-roll mill with the front roll at 105° C. and the rear roll at 60° C. That no cross-linking had occurred during this operation was apparent from the observation that a 0.25 gm. sample of the crepe so obtained could be shaped readily by placing it between "Melinex"-lined aluminum plates ("Melinex" is a registered trademark) and pressing at 120° C. and a pressure of up to 6,000 lbs./sq. in., to give a disc with a diameter of 2 to 2¼ in. and a thickness of about 0.006 inch. The composition was still uncross-linked at the end of this shaping process.

A 1 in. x 1½ in. sample was then cut from the disc, clipped to a support, placed in a vessel under dry nitrogen, and heated at 190° C. for 1 hour to cause the polyisocyanatobiuret to react with the amide groups in the polymer thereby cross-linking the composition.

A ¾" x ⅛" strip of film was cut from the cured, transparent sample and its tendency to flow at elevated temperatures was estimated from its stick temperature on a Kofler hot bar. This was found to be greater than 260° C., compared with 98–108° C. for samples obtained from the copolymer alone. An indication of the temperature at which the cured sample lost its mechanical properties was obtained by noting the temperature at which it lost its elasticity. This occurred at the very high temperature of 255° C.

Example 2

The procedure of Example 1 was repeated but this time the milled crepe was pressed between PTFE-lined aluminum plates at 200° C. Curing occurred towards the end of the pressing step but did not interfere with satisfactory completion of the pressing operation. Samples of the cured discs were found to stick to a hot bar at 255° C.

Similar results were obtained by pressing the milled crepe between "Melinex"-lined aluminum plates at 190° C. The loss of elasticity of this sample occurred at 250° C.

Example 3

The procedure of Example 1 was repeated but the amount of polyisocyanate was reduced to only 1.75% by weight of the copolymer, equivalent to 6.25% of the stoichiometric amount required to react with all the amide groups. Even the transparent cured films that were obtained from this composition had a stick temperature on a Kofler hot bar of 168° C., compared with 98–108° C. for the copolymer alone, indicating that still less polyisocyanate may be used with effect.

Raising the pressing temperature to 190° C. in an attempt to press and cure the composition in the same operation was only partly successful, probably due to insufficient time (about 20 minutes) being allowed for curing. The partially cured films so obtained stuck to a Kofler hot bar at 120° C.

Example 4

Repeating the procedure of Example 1 with a copolymer of about 70% by weight ethylene and 30% by weight of 2-hydroxyethyl methacrylate gave substantially the same results although the reaction between the copolymer and the polyisocyanatobiuret seemed to be quicker. The use of a copolymer of ethylene and methacrylic acid, however, yielded cured products that were bubbled due to evolution of $CO_2$.

In all the above examples the polyisocyanatobiuret that was used was obtained by heating three moles of hexamethylene diisocyanate with one mole of water, e.g. as described in British patent specification No. 876,503. The product was essentially the triisocyanatobiuret derivative of hexamethylene diamine, i.e. 1,3,5-tris(isocyanatohexyl)biuret.

We claim:
1. A process for the production of shaped cross-linked articles which comprises heating a composition comprising:
(i) a copolymer containing 99% to 60% by weight of ethylene and 1 to 40% by weight of an ethylenically unsaturated carboxylic acid amide, and
(ii) a compound having the structure

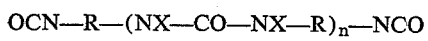

where R is polymethylene, each X is selected from the group consisting of H and

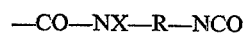

but at least one X is —CO—NX—R—NCO, and $n$ is an integer of from 1 to 5 to a temperature at which the said copolymer is in a fluid state, shaping the composition with said copolymer in the fluid state, completing the shaping process before the composition has become infusible and thereafter heating the shaped article at a temperature of from 150° C. to 220° C.

2. A process according to claim 1 in which the ethylenically unsaturated carboxylic acid amide is selected from the group consisting of acrylamide and methacrylamide.

3. A process according to claim 1 in which the ethylenically unsaturated carboxylic acid amide comprises from 5% to 25% by weight of the copolymer.

4. A process according to claim 1 in which the compound of structure

OCN—R—(NX—CO—NX—R)$_n$—NCO is present in an amount of from 0.025 to 1 molar proportion per molar proportion of ethylenically unsaturated carboxylic acid amide in the copolymer.

5. A process according to claim 1 in which said compound is 1,3,5-tris(isocyanatohexyl)biuret.

6. A cross-linkable composition which is capable of being shaped, said composition comprising:
 (i) a copolymer containing 99% to 60% by weight of ethylene and 1 to 40% by weight of an ethylenically unsaturated carboxylic acid amide, and
 (ii) a compound having the structure OCN—R—(NX—CO—NX—R)$_n$—NCO where R is polymethylene, each X is selected from the group consisting of H and

—CO—NX—R—NCO but at least one X is —CO—NX—R—NCO, and $n$ is an integer of from 1 to 5.

References Cited

UNITED STATES PATENTS

| | | | |
|---|---|---|---|
| 3,025,269 | 3/1962 | Calfee | 260—77.5 |
| 3,028,367 | 4/1962 | O'Brien | 260—77.5 |
| 3,036,045 | 5/1962 | Short et al. | 260—77.5 |
| 3,178,380 | 4/1965 | Porret | 260—21 |
| 3,245,941 | 4/1966 | Mayer et al. | 260—31.6 |
| 3,284,415 | 11/1966 | Horvath | 260—77.5 |

DONALD E. CZAJA, *Primary Examiner.*

F. McKELVEY, *Assistant Examiner.*